US011898332B1

(12) United States Patent
Bridenbaugh et al.

(10) Patent No.: US 11,898,332 B1
(45) Date of Patent: Feb. 13, 2024

(54) ADJUSTING CAMERA BANDWIDTH BASED ON MACHINE OPERATION

(71) Applicant: Caterpillar Inc., Peoria, IL (US)

(72) Inventors: Michael William Bridenbaugh, Pittsburgh, PA (US); Matthew Daniel Fike, Peoria, IL (US); Micheal D. Valerio, Morton, IL (US); Brad Robert Van De Veer, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/821,266

(22) Filed: Aug. 22, 2022

(51) Int. Cl.
E02F 9/26 (2006.01)
E02F 9/20 (2006.01)
G05D 1/02 (2020.01)
H04N 23/61 (2023.01)
H04N 23/90 (2023.01)
H04N 23/661 (2023.01)

(52) U.S. Cl.
CPC .............. E02F 9/264 (2013.01); H04N 23/61 (2023.01); H04N 23/661 (2023.01); H04N 23/90 (2023.01)

(58) Field of Classification Search
CPC .......... E02F 9/264; E02F 9/205; E02F 9/261; H04N 23/61; H04N 23/661; H04N 23/90; G05D 1/0246; G05D 2201/021; G05D 2201/0201
See application file for complete search history.

(56) References Cited

U.S. PATENT DOCUMENTS

| 5,954,143 | A | * | 9/1999 | McCabe | ................. E21B 7/025 173/171 |
| 6,739,078 | B2 | * | 5/2004 | Morley | .................... E02F 9/205 701/50 |
| 9,639,958 | B2 | | 5/2017 | Reiners et al. | |
| 9,813,469 | B2 | * | 11/2017 | Lundquist | ........... H04L 41/0896 |
| 10,793,091 | B2 | | 10/2020 | Hu et al. | |
| 11,025,918 | B2 | | 6/2021 | Chen et al. | |

(Continued)

FOREIGN PATENT DOCUMENTS

FR 3083908 B1 6/2020
JP 2009081496 A 4/2009
(Continued)

Primary Examiner — Brian P Yenke
(74) Attorney, Agent, or Firm — Harrity & Harrity, LLP

(57) ABSTRACT

A controller may monitor a plurality of operations performed using one or more implements of the work machine. The controller may determine that the work machine is performing a particular operation based on monitoring the plurality of operations. The controller may obtain, based on information regarding the particular operation, camera view information, from a data structure, indicating that the particular operation is associated with a particular camera of a plurality of cameras of the work machine. Each camera, of the plurality of cameras, may capture a respective view of a plurality of views of the work machine. The controller may determine, based on the camera view information, that a bandwidth associated with a video stream, of a particular view of the work machine captured by the particular camera, is to be increased. The controller may increase the bandwidth associated with the video stream provided by the particular camera based on determining that the bandwidth is to be increased.

20 Claims, 6 Drawing Sheets

(56) References Cited

U.S. PATENT DOCUMENTS

| | | | |
|---|---|---|---|
| 2003/0036817 A1* | 2/2003 | Morley | E02F 9/205 700/245 |
| 2008/0089328 A1* | 4/2008 | Wood | H04L 67/12 370/389 |
| 2008/0180523 A1* | 7/2008 | Stratton | G09B 9/048 348/114 |
| 2009/0177337 A1* | 7/2009 | Yuet | G05D 1/0044 701/2 |
| 2011/0241904 A1* | 10/2011 | Cho | H04W 52/0251 340/989 |
| 2012/0154572 A1* | 6/2012 | Stratton | G05D 1/0044 348/114 |
| 2012/0218416 A1* | 8/2012 | Leny | H04N 7/181 348/E7.085 |
| 2014/0293047 A1 | 10/2014 | Morris | |
| 2014/0300826 A1* | 10/2014 | Funke | H04N 21/42204 348/734 |
| 2016/0112678 A1 | 4/2016 | Suvanen | |
| 2016/0217331 A1* | 7/2016 | Kowatari | H04N 7/181 |
| 2016/0275696 A1* | 9/2016 | Reiners | G06T 11/001 |
| 2019/0208136 A1* | 7/2019 | Wendel | H04N 23/80 |
| 2020/0064837 A1* | 2/2020 | Zhang | G05D 1/0246 |
| 2021/0293562 A1 | 9/2021 | Bang et al. | |
| 2022/0061651 A1 | 3/2022 | Carroll et al. | |
| 2022/0236741 A1* | 7/2022 | Bridenbaugh | G05D 1/027 |
| 2023/0069482 A1* | 3/2023 | Deshpande | G06V 20/52 |

FOREIGN PATENT DOCUMENTS

| | | |
|---|---|---|
| JP | 6134301 B2 | 5/2017 |
| WO | 2020241269 A1 | 12/2020 |

* cited by examiner

ADJUSTING CAMERA BANDWIDTH BASED ON MACHINE OPERATION

TECHNICAL FIELD

The present disclosure relates generally to adjusting bandwidths of cameras of a machine and, for example, to adjusting the bandwidths based on operations of the machine.

BACKGROUND

A work machine may be provided with multiple cameras. The cameras may be used during a remote control operation of the work machine. Each camera may provide a different view of the work machine to enable an operator to properly operate the work machine. Typically, a bandwidth allocated to the cameras is limited (e.g., due to a need to wirelessly transmit image data for remote control operation of the work machine). The limited bandwidth may degrade a quality of a video feed associated with images captured by the cameras.

In some instances, an equal portion of the limited bandwidth may be evenly allocated to each camera. Typically, one or more cameras are not utilized when the machine is performing an operation. Accordingly, the one or more cameras may unnecessarily utilize the one or more portions of the bandwidth allocated to the one or more cameras. Therefore, the one or more portions of the bandwidth may be wasted, while a quality of a video stream associated with a camera utilized during the operation may be degraded.

SUMMARY

In some implementations, a method performed by a controller of a work machine includes monitoring a plurality of operations performed using one or more implements of the work machine; determining that the work machine is performing a particular operation of the plurality of operations based on monitoring the plurality of operations; obtaining, based on information regarding the particular operation, camera view information, from a data structure, indicating that the particular operation is associated with a particular camera of a plurality of cameras of the work machine, and wherein each camera, of the plurality of cameras, captures a respective view of a plurality of views of the work machine; determining, based on the camera view information, that a bandwidth associated with a video stream, of a particular view, of the plurality of views, of the work machine captured by the particular camera, is to be increased; and increasing the bandwidth associated with the video stream provided by the particular camera based on determining that the bandwidth is to be increased.

In some implementations, a system comprises: a plurality of cameras associated with a machine, wherein each camera, of the plurality of cameras, captures a respective view of a plurality of views of the machine; and a controller, associated with the machine, configured to: determine that the machine is performing a particular operation of a plurality of operations, wherein the plurality of operations includes one or more operations performed by one or more implements of the machine; obtain camera view information indicating that the particular operation is associated with a particular camera of the plurality of cameras, wherein the camera view information is obtained using information regarding the particular operation, and wherein the camera view information includes information identifying the particular camera; determine, based on the camera view information, that a bandwidth associated with a video stream, of a particular view of the machine captured by the particular camera, is to be increased; and increase the bandwidth associated with the video stream based on determining that the bandwidth is to be increased.

In some implementations, a machine includes one or more implements; a plurality of cameras provided at different portions of the machine, wherein each camera, of the plurality of cameras, captures a respective view of a plurality of views of the machine; and a controller configured to: determine that the machine is performing a particular operation using a particular implement of the one or more implements; determine a particular camera, of the plurality of cameras, provided closest to the particular implement; determine that a bandwidth associated with a video stream, of a particular view of the machine captured by the particular camera, is to be adjusted; and adjust the bandwidth associated with the video stream based on determining that the bandwidth is to be increased.

DETAILED DESCRIPTION

Implementations described herein are directed to determining a particular camera, of a plurality of cameras of a machine, that is associated with a particular operation performed by a machine and adjusting a bandwidth associated with the particular camera. As an example, the bandwidth may be a bandwidth associated with a video stream of a particular view of the machine captured by the particular camera.

In some situations, a controller may determine the particular camera using a data structure. The data structure may store information identifying each operation, of a plurality of operations performed by the machine, in association with information identifying one or more cameras that are utilized during the operation.

In some situations, the controller may determine the particular camera based on a proximity of the particular camera to an implement used to perform the operation. For example, the particular camera may be a camera provided closest to the implement.

In some examples, when adjusting the bandwidth, the controller may increase the bandwidth when the particular operation is being performed. In some situations, the bandwidth may be a bandwidth limit of the particular camera (e.g., an amount of bandwidth allocated to the particular camera). The controller may decrease bandwidths associated with other cameras of the machine based on determining that the other cameras are not being utilized during the particular operation.

In some situations, the controller may adjust the bandwidth of the particular camera based on determining whether the particular operation is performed autonomously. For example, the controller may decrease the bandwidth of the particular camera if the particular operation is performed autonomously.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
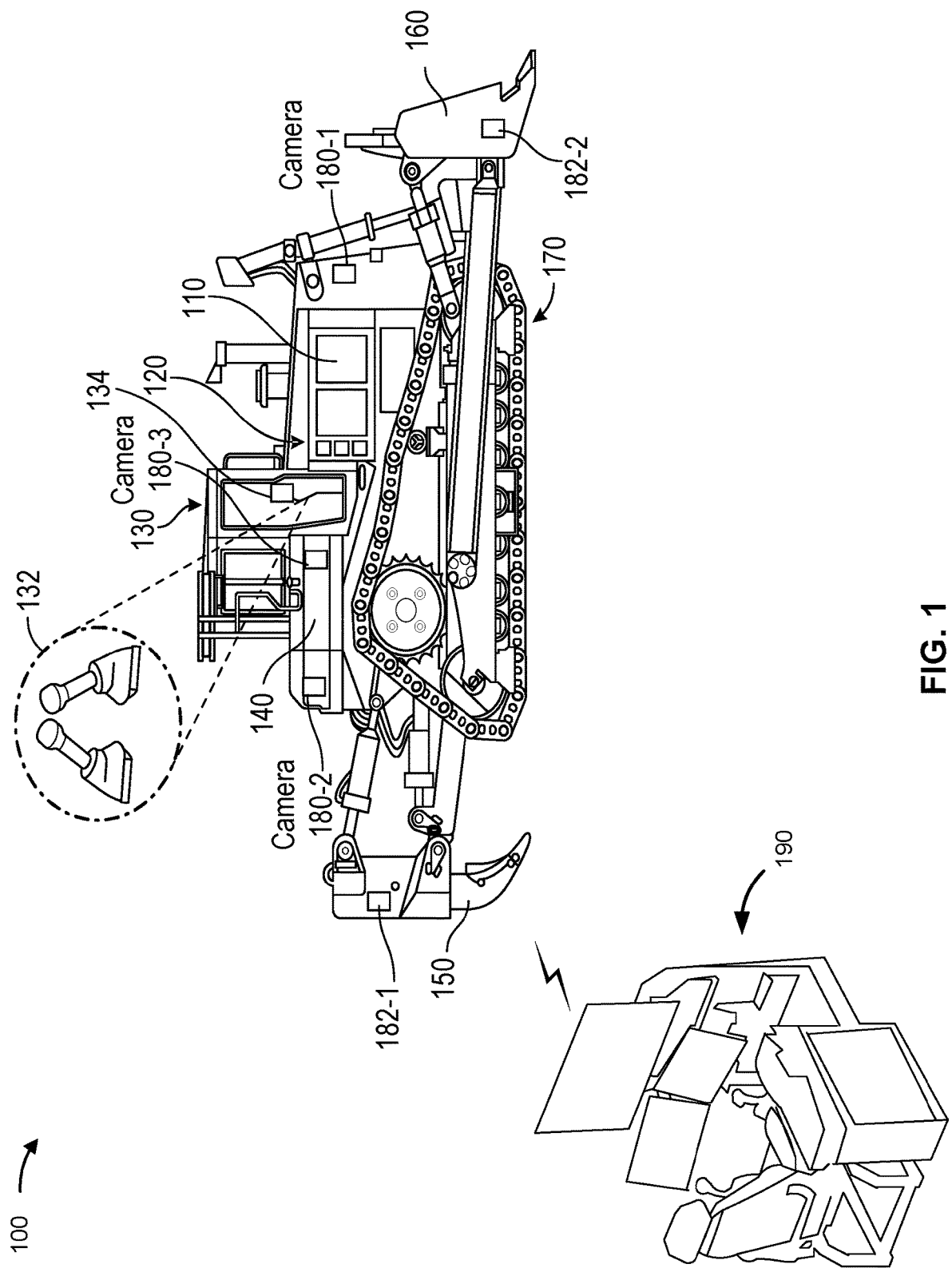
FIG. 1 is a diagram of an example machine described herein.

FIG. 1 is a diagram of an example machine 100 described herein. As shown in FIG. 1, machine 100 is as an earth moving machine, such as a dozer. Alternatively, machine 100 may be another type of machine, such as an excavator, a wheel loader, among other examples.

As shown in FIG. 1, machine 100 includes an engine 110, a sensor system 120, an operator cabin 130, operator controls 132, a controller 140, a rear attachment 150, a front attachment 160, ground engaging members 170, one or more cameras 180 (individually referred to as "camera 180"), and one or more inertial measurement units (IMUs) 182 (individually referred to as "IMU 182").

Engine 110 may include an internal combustion engine, such as a compression ignition engine, a spark ignition engine, a laser ignition engine, a plasma ignition engine, and/or the like. Engine 110 provides power to machine 100 and/or a set of loads (e.g., components that absorb power and/or use power to operate) associated with machine 100. For example, engine 110 may provide power to one or more control systems (e.g., controller 140), sensor system 120, operator cabin 130, and/or ground engaging members 170.

Engine 110 can provide power to an implement of machine 100, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 100.

Sensor system 120 may include sensor devices that are capable of generating signals regarding an operation of machine 100. The sensor devices, of sensor system 120, may include a velocity sensor device, a load sensor device, a pressure sensor device, a position sensor device, a temperature sensor device, a vibration sensor device, a motion sensor device, among other examples.

Operator cabin 130 includes an integrated display (not shown), operator controls 132, and a camera tracking device 134. Operator controls 132 may include one or more input components (e.g., integrated joysticks, push-buttons, control levers, and/or steering wheels) to control an operation of machine 100. For example, operator controls 132 may be used to control an operation of one or more implements of machine 100 (e.g., rear attachment 150 and/or front attachment 160) and/or control an operation of ground engaging members 170. In some examples, operator controls 132 may generate operator control data. Operator control data may be used to determine the operation performed by machine 100.

Camera tracking device 134 includes one or more devices to monitor usages of cameras 180 during various operations of machine 100. As an example, camera tracking device 134 may include an eye tracking device configured to generate viewing information indicating a viewing direction of an operator of machine 100. The viewing information may be used to identify a camera utilized by the operator. In some instances, camera usage data may be generated based on monitoring the usages of the plurality of cameras. For example, the camera usage data may indicate that a first camera 180 is utilized during a first operation, a second camera 180 and a third camera 180 are utilized during a second operation, and so on.

Controller 140 (e.g., an electronic control module (ECM)) may control and/or monitor operations of machine 100. For example, controller 140 may control and/or monitor the operations of machine 100 based on signals from operator controls 132, from sensor system 120, from cameras 180, from IMUs 182, and/or from remote control device 190, as described in more detail below.

Rear attachment 150 may include a ripper assembly, a winch assembly, and/or a drawbar assembly. Front attachment 160 may include a blade assembly, a bucket, among other examples. Front attachment 160 and/or rear attachment 150 may be referred to as implements of machine 100. Ground engaging members 170 may be configured to propel machine 100. Ground engaging members 170 may include wheels, tracks, rollers, and/or similar components, for propelling machine 100. Ground engaging members 170 may include an undercarriage that includes tracks (as shown in FIG. 1).

A camera 180 includes one or more devices capable of capturing a view of machine 100. For example, camera 180-1 may be configured to capture a front view of machine 100, camera 180-2 may be configured to capture a rear view of machine 100, camera 180-3 may be configured to capture a first side view of machine 100, and so on. In some examples, camera 180 may be a monocular camera. Alternatively, camera 180 may be a stereo camera.

An IMU 182 includes one or more devices that are capable of receiving, generating, storing, processing, and/or providing signals that may be used to determine a position and orientation of a component, of machine 100, on which the IMU 182 is installed. For example, IMU 182-1 may be provided on rear attachment 150, IMU 182-2 may be provided on front attachment 160, and so on. IMU 182 may include one or more accelerometers and/or one or more gyroscopes.

The one or more accelerometers and/or the one or more gyroscopes generate and provide signals that can be used to determine a position and orientation of the IMU 182 relative to a frame of reference and, accordingly, a position and orientation of the component. For example, an IMU 182 may provide signals that may be used to determine a current position of the implement of machine 100 relative to a chassis of machine 100. In some examples, the position of the implement may be used to determine an operation being performed by machine 100. Additionally, or alternatively, the signals may be used to detect a movement of the implement.

While the example discussed herein refers to IMUS 182, the present disclosure is applicable to using one or more other types of sensor devices that may be used to determine a position and orientation of a component of machine 100.

IMU 182 may provide signals periodically (e.g., every twenty milliseconds, every fifty milliseconds, among other examples). Additionally, or alternatively, IMU 182 may provide signals based on a trigger (e.g., based on receiving a request from controller 140).

Remote control device 190 may include one or more devices that are configured to be used for a remote control operation of machine 100 (e.g., a remote control operation without line-of-sight with respect to machine 100). For example, remote control device 190 may include one or more displays, one or more operator controls (similar to the operator controls of machine 100), one or more controllers (similar to controller 140), a wireless communication component, among other examples.

Remote control device 190 may establish a communication with machine 100 via the wireless communication component and may control machine 100 using the wireless communication. Remote control device 190 may display, via the one or more displays, a video feed (including image data obtained by a camera 180). In some examples, remote control device 190 may include one or more input components (e.g., a keyboard, a microphone, joysticks, buttons, pedals, among other examples) that are used to provide input regarding the video feed.

As indicated above, FIG. 1 is provided as an example. Other examples may differ from what is described in connection with FIG. 1.

Figure 2:
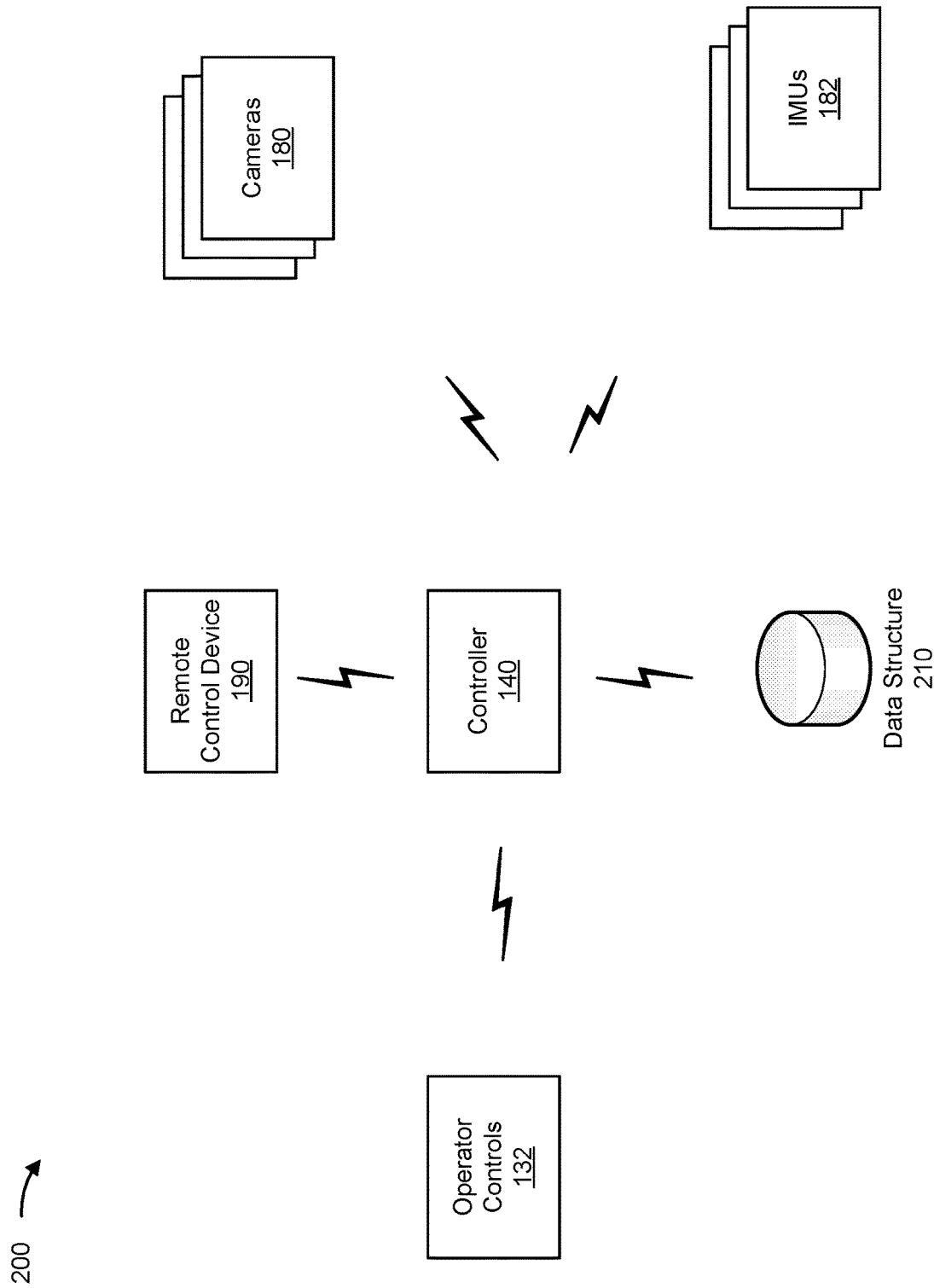
FIG. 2 is a diagram of an example system described herein.

FIG. 2 is a diagram of an example system 200 described herein. As shown in FIG. 2, system 200 includes operator controls 132, controller 140, cameras 180, remote control device 190, and a data structure 210. In some instances, system 200 may further include IMUs 182. Some elements of FIG. 2 have been described in connection with FIG. 1.

Data structure 210 may include a database, a table, and/or a linked list that stores camera view information identifying the plurality of operations in association with information identifying the plurality of cameras. For example, information identifying each operation, of the plurality of operations, may be associated with information identifying a respective camera of the plurality of cameras. For instance, data structure 210 may store information indicating that a ripping operation (e.g., performed using rear attachment 150) is associated with a camera 180 capturing a rear view of machine 100 (e.g., camera 180-1), information indicating that an earth moving operation (e.g., performed using front attachment 160) is associated with cameras 180 capturing side views of machine 100 (e.g., camera 180-3 and another camera 180 that captures a side view of machine 100), and so on.

In some implementations, data structure 210 may store information regarding each work cycle, of a plurality of work cycles of machine 100, in association with information identifying one or more cameras 180. The plurality of work cycles may include a load work cycle during which material is loaded using front attachment 160, a carry work cycle during which material is carried by front attachment 160, a spread work cycle during material is spread using front attachment 160, and so on. In some examples, the camera usage information may indicate that the load work cycle is associated with cameras 180 capturing the side views of machine 100, that the carry work cycle is associated with a camera 180 capturing a front view of machine 100, and that the spread work cycle is associated with cameras 180 capturing the side views of machine 100.

In some situations, the camera view information may be updated based on the camera usage data. For example, based on the camera usage data, the camera view information may be updated to associate information identifying one or more additional cameras to information identifying an operation. Alternatively, based on the camera usage data, the camera view information may be updated to disassociate information identifying one or more cameras from the information identifying the operation based on the camera usage data. As an example, the camera usage data may indicate that, during the earth moving operation, camera 180-2 (that captures a front view of machine 100) is utilized. Accordingly, data structure 210 may be updated to associate information identifying camera 180-2 with information identifying the earth moving operation.

In some situations, the camera usage data may be provided as an input to a machine learning model. For example, the machine learning model may analyze the camera usage data and generate, as an output, information identifying one or more cameras 180 utilized for a respective operation of one or more operations performed by machine 100.

In some implementations, controller 140 may monitor a plurality of operations performed by machine 100 using one or more implements of machine 100. For example, controller 140 may monitor the plurality of operations based on receiving the operator control data, based on detecting a movement of the one or more implements using signals received from IMUs 182, and/or or based on detecting one or more positions of the one or more implements using the signals received from IMUs 182.

Based on monitoring the plurality of operations, controller 140 may determine that machine 100 is performing a particular operation using a particular implement. For example, controller 140 may determine that machine 100 is performing the particular operation based on the operator control data to move the particular implement. Additionally, controller 140 may determine that machine 100 is performing the particular operation based on detecting the movement of the particular implement. Additionally, controller 140 may determine that machine 100 is performing the particular operation based on detecting the one or more positions of the particular implement.

In some implementations, controller 140 may identify a camera 180 associated with the particular operation based on the camera view information stored in data structure 210. For example, controller 140 may perform a lookup of data structure 210 to obtain the camera view information. For instance, controller 140 may perform the lookup using information identifying the particular operation. Additionally, or alternatively, controller 140 may perform the lookup using information identifying a current work cycle of machine 100. Controller 140 may determine the current work cycle based on the operator control data, based on the movement of the particular implement, and/or based on the position of the particular implement.

In some implementations, controller 140 may identify the cameras 180 based on the locations of cameras 180 of machine 100. For example, controller 140 may identify a camera 180 that is closest to the particular implement being used to perform the particular operation and/or being used during the current work cycle.

Controller 140 may determine that a bandwidth associated with a video stream, of a particular view of machine 100 captured by the camera 180, is to be increased. For example, controller 140 may determine that the operator is utilizing the particular view during the particular operation or the current work cycle, and determine that other views of machine 100 are not being utilized during the particular operation or the current work cycle. Accordingly, controller 140 may determine that the bandwidth is to be increased and determine that bandwidths associated with video streams, of other views of the work machine captured by the other cameras, are to be decreased. The bandwidth is increased to improve the quality of the video stream provided by the particular camera, to improve an efficiency and/or an accuracy of the particular operation.

Controller 140 may increase the bandwidth associated with the video stream provided by the particular camera based on determining that the bandwidth is to be increased.

Conversely, controller 140 may decrease the bandwidths associated with the video streams, of the other views, based on determining that the bandwidths are to be decreased.

In some examples, the bandwidth may be increased by a particular amount. Accordingly, a total amount, of the bandwidths associated with the video streams of the other views, may be decreased by the particular amount. In some implementations, the video stream provided by the particular camera may be provided to remote control device 190. Accordingly, controller 140 may cause sizes of images of the video stream, provided to the remote control device, to be increased.

While the foregoing example has been described with respect to a dozer, implementations described herein are applicable to other machines, as described below. In some examples, with respect to a wheel loader, a controller of the wheel loader may determine that the wheel loader is performing a dumping operation based on a raise command to raise a bucket of the wheel loader (e.g., raise beyond a 50% height). Based on detecting the raise command, the controller may increase a bandwidth of a camera capturing a front view of the wheel loader.

In some examples, a controller of a machine may adjust bandwidths of cameras based on operations of access systems of the machine. For example, the controller may increase a bandwidth of a camera associated with a powered ladder based on detecting a motion of the powered ladder (e.g., based on detecting the powered ladder is being deployed). Similarly, the controller may increase a bandwidth of a camera associated with an enclosure based on detecting that the enclosure is being opened.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
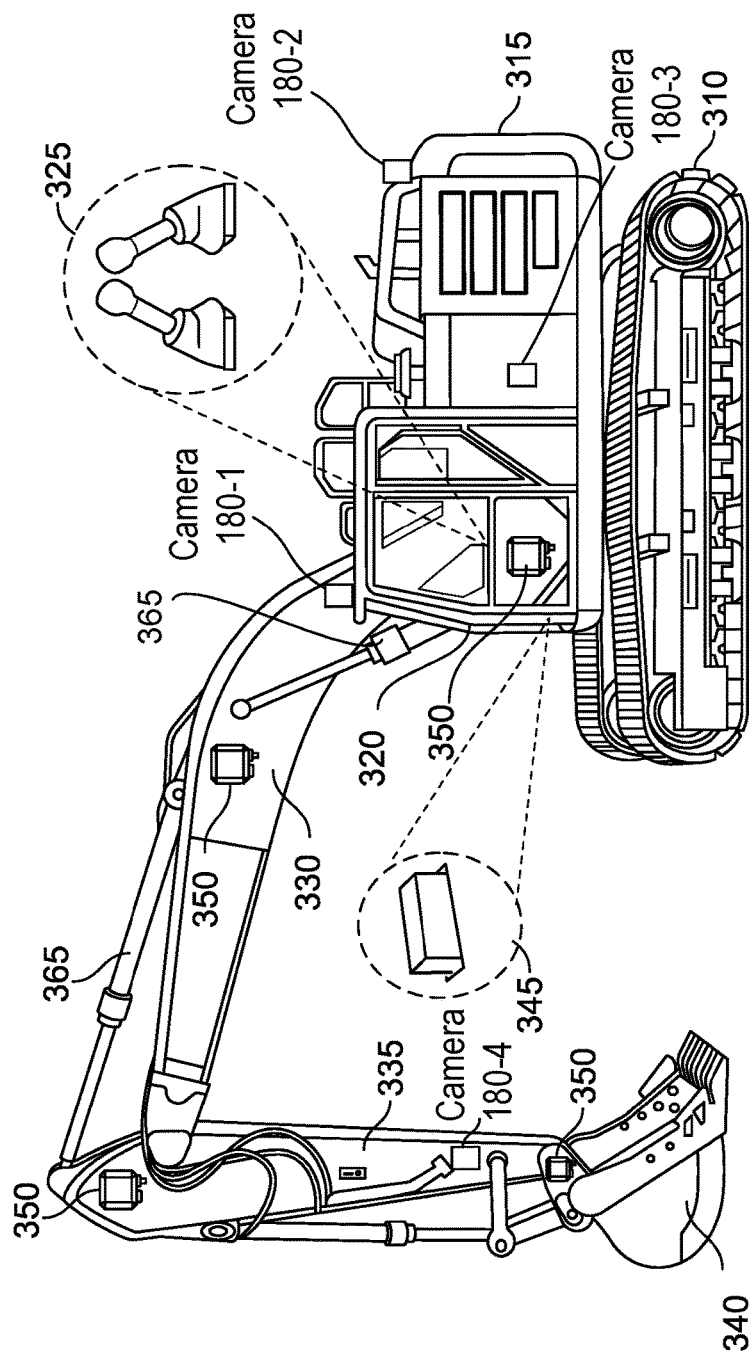
FIG. 3 is a diagram of an example machine described herein.

FIG. 3 is a diagram of an example machine 300 described herein. As shown in FIG. 3, machine 300 is embodied as an earth moving machine, such as an excavator. Alternatively, the machine 300 may be another type of machine, such as a dozer.

As shown in FIG. 3, machine 300 includes ground engaging members 310, a machine body 315, and an operator cabin 320. Ground engaging members 310 may include tracks (as shown in FIG. 3), wheels, rollers, and/or the like, for propelling machine 300. Ground engaging members 310 are mounted to a rotating frame (not shown) and are driven by one or more engines and drive trains (not shown). Machine body 315 is mounted on the rotating frame (not shown). Operator cabin 320 is supported by machine body 315 mounted on the rotating frame. Operator cabin 320 includes an integrated display (not shown) and operator controls 325, such as, for example, an integrated joystick.

As shown in FIG. 3, machine 300 includes a boom 330, a stick 335, and a machine work tool 340. Boom 330 and/or stick 335 may be actuated by hydraulic cylinders 365. Boom 330 and/or stick 335 may be referred to as a linkage. Machine work tool 340 is mounted at a distal end of stick 335.

As shown in FIG. 3, machine 300 includes a controller 345 (e.g., an electronic control module (ECM), a computer vision controller, an autonomy controller, among other examples), and one or more IMUs 350. As shown in FIG. 3, IMUs 350 are installed at different positions on components or portions of machine 300.

As shown FIG. 3, cameras 180 may be provided on different portions of machine 300. Cameras 180 may be configured to capture different views of machine 300 in a manner similar to the manner described above. In some situations, controller 345 may be configured to adjust a bandwidth associated with cameras 180 based on different operations performed by machine 300, in a manner similar to the manner described above.

The different operations may include a first swinging of an implement (e.g., boom 330, stick 335, and/or machine work tool 340) of machine 100 in a first direction (e.g., left direction), a second movement of the implement in a second direction (e.g., right direction) opposite the first direction, and a digging operation performed by the implement. Machine 300 may determine a particular operation of the different operations performed using the implement, in a manner similar to the manner described above.

Controller 345 may obtain the camera view information in a manner similar to the manner described above. The camera view information may identify a first camera 180 (provided on a left side of machine 300) associated with the first movement, may identify a second camera 180 (provided on a right side of machine 300) associated with the second movement, and may identify a third camera 180 (provided on stick 335) associated with the digging operation.

Controller 345 may adjust the bandwidths associated with cameras 180 in a manner similar to the manner described above. For example, during the first movement, controller 345 may increase the bandwidth associated with the first camera 180 and decrease the bandwidths associated with the second camera 180 and the third camera 180; during the second movement, controller 345 may increase the bandwidth associated with the second camera 180 and decrease the bandwidths associated with the first camera 180 and the third camera 180; and so on.

As indicated above, FIG. 3 is provided as an example. Other examples may differ from what is described in connection with FIG. 3.

Figure 4:
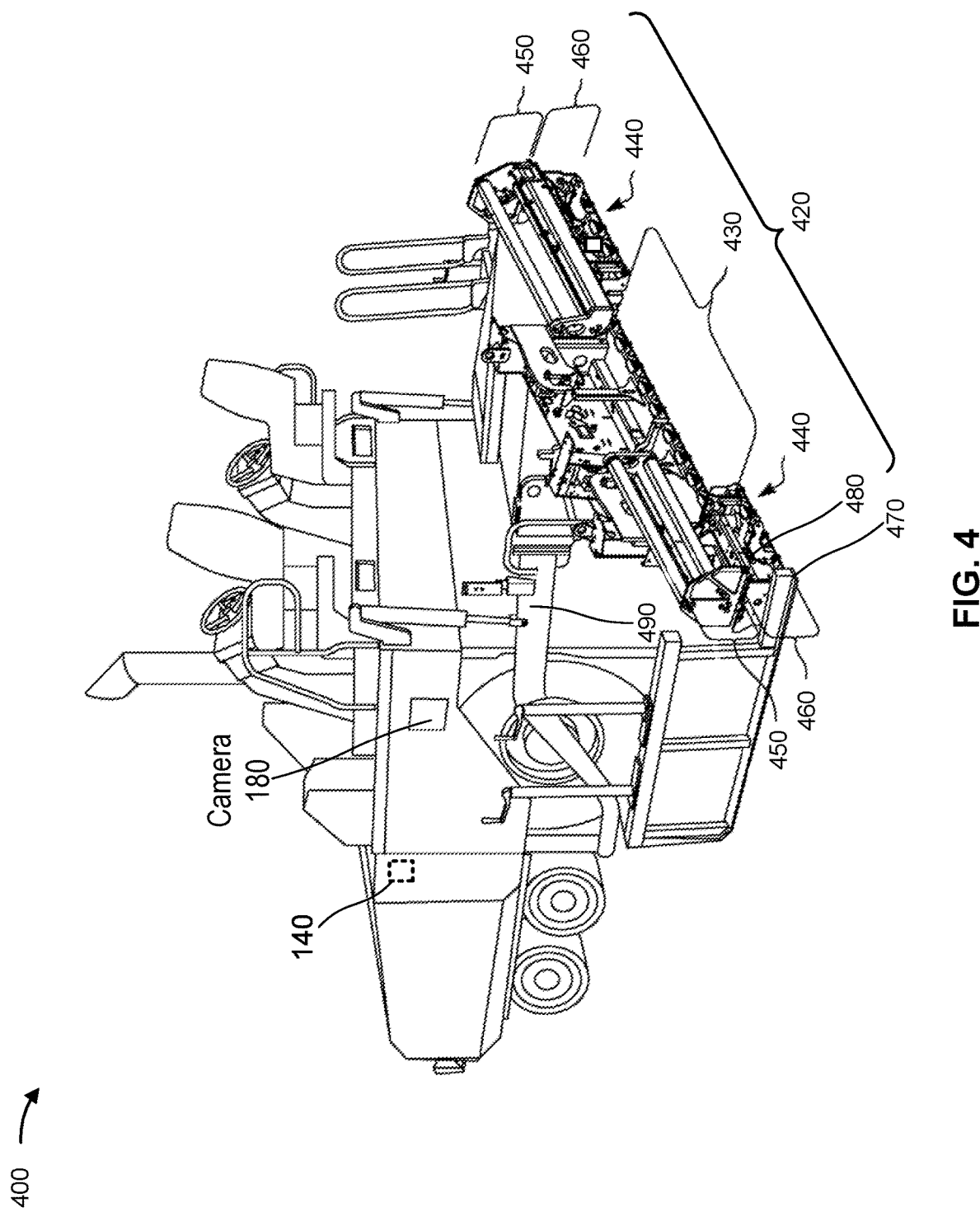
FIG. 4 is a diagram of an example machine described herein.

FIG. 4 is a diagram relating to an example paving machine 400 that includes a screed assembly 420, controller 140, and one or more cameras 180. The paving machine 400 may be a road paver, an asphalt finisher, or a similar machine. As shown in FIG. 4, the screed assembly 420 may include a primary screed 430 and a pair of screed extensions 440 (e.g., that are disposed on opposite sides of the primary screed 430). Each screed extension 440 may be moveably coupled to the primary screed 430.

As shown in FIG. 4, a screed extension 440 includes an upper frame 450, a lower frame 460, and a screed extension plate 470 that attaches to a lower edge of the lower frame 460. As further shown in FIG. 4, a set of linkage systems 480 may be used to connect upper frame 450 and lower frame 460. The set of linkage systems 480 may be adjusted to control a height of lower frame 460 (e.g., a distance between the lower edge of lower frame 460 and a work surface underneath the lower edge of lower frame 460) and/or an angle of attack of the lower frame 460 (e.g., an angle screed extension plate 470 that attaches to the lower edge of lower frame 460 makes when contacting the work surface).

As shown in FIG. 4, screed assembly 420 may be connected to a frame of paving machine 400 by a set of screed support arms 490 (also referred to as tow arms). In some situations, screed support arms 490 may be substantially horizontal and parallel to one another, extending along the frame of paving machine 400. Screed support arms 490 may be pivotally connected to the frame of paving machine 400, thereby permitting vertical movement of screed assembly 420.

Cameras 180 may be provided on side surfaces, of paving machine 400, adjacent to screed support arms 490. For example, a first camera 180 may be provided on a left side surface of paving machine 400 and a second camera 180 may be provided on a right side surface of paving machine 400. Controller 140 may adjust the bandwidths of cameras 180 based on lateral movements of screed assembly 420. For example, controller 140 may increase the bandwidth of the first camera 180 and decrease the bandwidth of the second camera 180 when screed assembly 420 moves in a left direction. Conversely, controller 140 may increase the bandwidth of the second camera 180 and decrease the bandwidth of the first camera 180 when screed assembly 420 moves in a right direction.

As indicated above, FIG. 4 is provided as an example. Other examples may differ from what is described in connection with FIG. 4.

Figure 5:
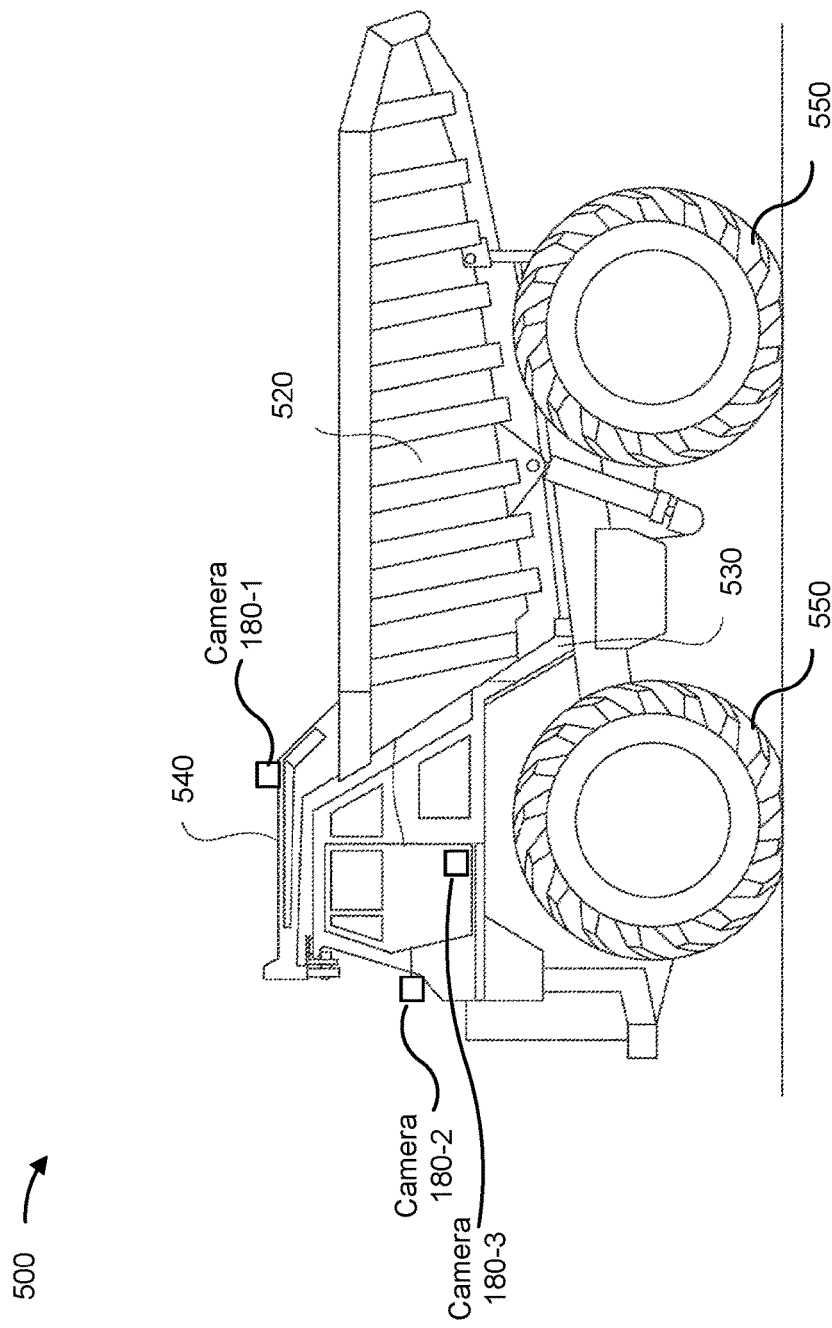
FIG. 5 is a diagram of an example machine described herein.

FIG. 5 is a diagram of an example machine 500 described herein. 500Machine 500 is embodied as an earth moving machine, such as a mining vehicle. As shown in FIG. 5, machine 500 may be located on a ground surface at the job site.

As shown in FIG. 5, machine 500 includes a truck body 520, a frame 530, a canopy 540, and ground engaging members 550. Truck body 520 may be capable of receiving and dumping a load. Truck body 520 may include a canopy 540. As machine 500 carries the load to a destination associated with the load, truck body 520 may pivot about frame 530 to discharge the load via a rearward opening of truck body 520. Ground engaging members 550 may be configured to propel machine 500. Ground engaging members 550 may include wheels, tracks, rollers, and/or similar components, for propelling machine 500.

As shown in FIG. 5, multiple cameras 180 may be provided on machine 500 (e.g., on canopy 540, on a front portion of machine 500, on a side surface of machine 100, among other examples). In some implementations, a bandwidth associated with camera 180 may be increased during a dumping operation.

As indicated above, FIG. 5 is provided as an example. Other examples may differ from what is described in connection with FIG. 5.

Figure 6:
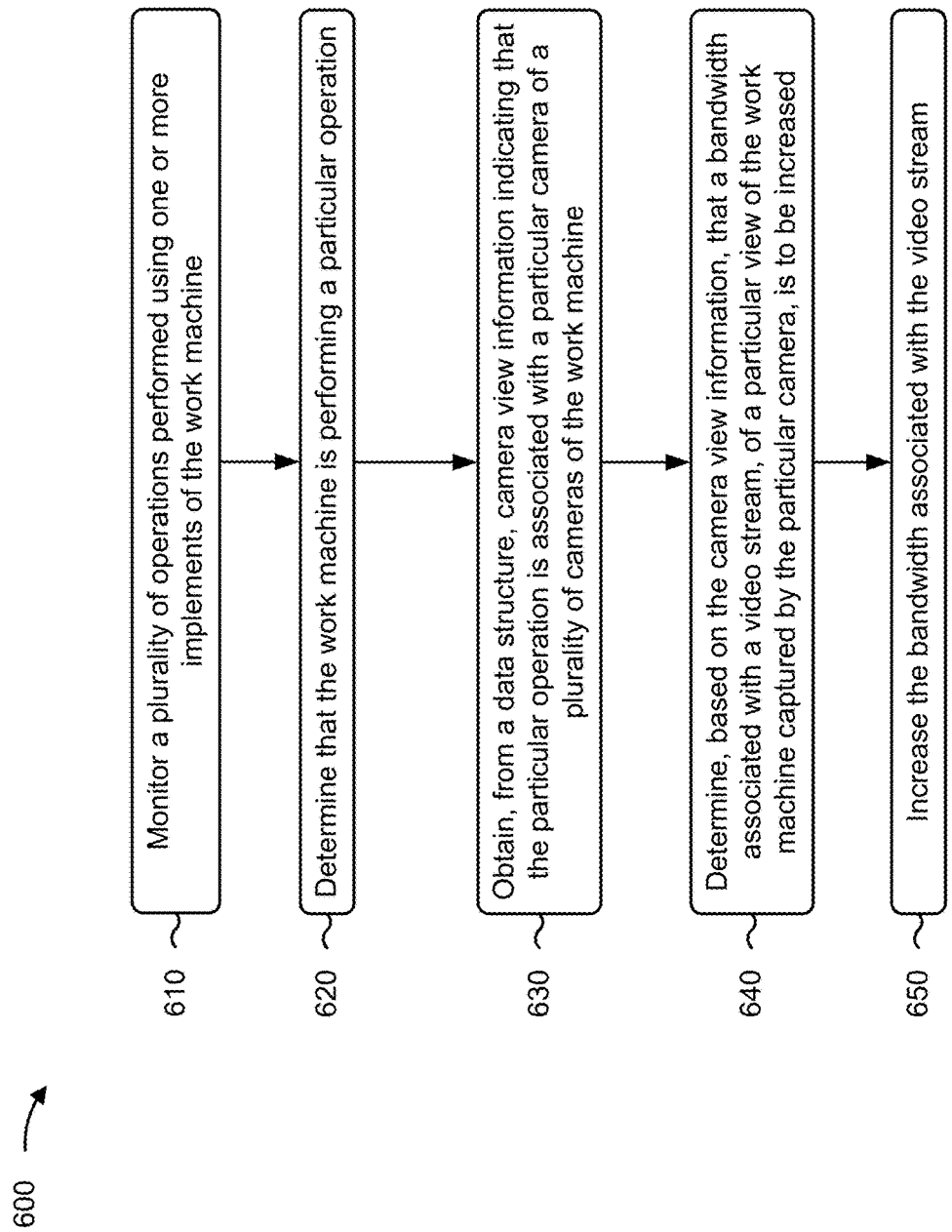
FIG. 6 is a flowchart of an example process related to adjusting bandwidths of cameras based on operations of a machine.

FIG. 6 is a flowchart of an example process 600 relating to adjusting bandwidths of cameras based on operations of a machine. In some implementations, one or more process blocks of FIG. 6 may be performed by a controller (e.g., controller 140). In some implementations, one or more process blocks of FIG. 6 may be performed by another device or a group of devices separate from or including the controller, such as operator controls (e.g., operator control 132), cameras (e.g., cameras 180), and/or IMUs (e.g., IMUs 182).

As shown in FIG. 6, process 600 may include monitoring a plurality of operations performed using one or more implements of the work machine (block 610). For example, the controller may monitor a plurality of operations performed using one or more implements of the work machine, as described above.

As further shown in FIG. 6, process 600 may include determining that the work machine is performing a particular operation of the plurality of operations based on monitoring the plurality of operations (block 620). For example, the controller may determine that the work machine is performing a particular operation of the plurality of operations based on monitoring the plurality of operations, as described above.

As further shown in FIG. 6, process 600 may include obtaining, from a data structure, camera view information indicating that the particular operation is associated with a particular camera of a plurality of cameras of the work machine, wherein the camera view information is obtained using information regarding the particular operation, and wherein each camera, of the plurality of cameras, captures a respective view of a plurality of views of the work machine (block 630). For example, the controller may obtain, from a data structure, camera view information indicating that the particular operation is associated with a particular camera of a plurality of cameras of the work machine, wherein the camera view information is obtained using information regarding the particular operation, and wherein each camera, of the plurality of cameras, captures a respective view of a plurality of views of the work machine, as described above.

As further shown in FIG. 6, process 600 may include determining, based on the camera view information, that a bandwidth associated with a video stream, of a particular view of the work machine captured by the particular camera, is to be increased (block 640). For example, the controller may determine, based on the camera view information, that a bandwidth associated with a video stream, of a particular view of the work machine captured by the particular camera, is to be increased, as described above.

As further shown in FIG. 6, process 600 may include increasing the bandwidth associated with the video stream provided by the particular camera based on determining that the bandwidth is to be increased (block 650). For example, the controller may increase the bandwidth associated with the video stream provided by the particular camera based on determining that the bandwidth is to be increased, as described above.

In some implementations, process 600 includes determining, based on the camera view information, that other cameras of the plurality of cameras are not utilized during the particular operation, determining that bandwidths associated with video streams, of other views of the work machine captured by the other cameras, are to be decreased based on determining that the other cameras of the plurality of cameras are not utilized during the particular operation, and decreasing the bandwidths associated with the video streams based on determining that the bandwidths are to be decreased.

In some implementations, process 600 includes determining that the particular operation is a ripping operation performed by a first implement of the one or more implements or an earth moving operation performed a second implement of the one or more implements, and determining, based on the camera view information, that the particular operation is associated with a first camera based on determining that the particular operation is the ripping operation, or determining, based on the camera view information, that the particular operation is associated with a second camera and a third camera based on determining that the particular operation is the earth moving operation.

In some implementations, the data structure stores information identifying the plurality of operations in association with information identifying the plurality of cameras. Information identifying each operation, of the plurality of operations, is associated with information identifying a respective camera of the plurality of cameras.

In some implementations, the work machine is operated by a remote control device, and process 600 includes causing sizes of images of the video stream, provided to the remote control device, to be increased.

In some implementations, the particular operation is a first operation and the particular camera is a first camera, and process 600 includes monitoring usages of the plurality of cameras during the plurality of operations, generating camera usage data based on monitoring the usages of the plurality of cameras, wherein the camera usage data indicates that a second camera, of the plurality of cameras, is used during a second operation of the plurality of operations, and updating the data structure based on the camera usage data.

In some implementations, process 600 includes at least one of detecting a movement of the one or more implements, receiving operator control data from an operator control that controls the one or more implements, or detecting one or more positions of the one or more implements. Process 600 further includes determining that the work machine is performing the particular operation further comprises determining that the work machine is performing the particular operation based on the at least one of detecting the movement, receiving the operator control data, or detecting the position of the one or more implements.

In some implementations, process 600 includes determining, using a machine learning model, one or more respective cameras, of the plurality of cameras, associated with each operation of the plurality of operations, and updating the data structure to include information identifying one or more respective cameras, of the plurality of cameras, associated with each operation of the plurality of operations.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

Implementations described herein are directed to determining a particular camera, of a plurality of cameras of a machine, that is associated with a particular operation performed by a machine and adjusting a bandwidth associated with the particular camera.

In some examples, when adjusting the bandwidth, the controller may increase the bandwidth when the particular operation is being performed. Conversely, the controller may decrease the bandwidth associated with other cameras of the machine based on determining that the other cameras are not being utilized during the particular operation.

By adjusting the bandwidth of the particular camera and decreasing the bandwidth associated with the other cameras as described herein, implementations may prevent wasting bandwidths allocated to the cameras. Additionally, by adjusting (e.g., increasing) the bandwidth of the particular camera as described herein, a quality of a video stream associated with the particular camera may be enhanced.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method performed by a controller of a work machine, the method comprising:
   monitoring a plurality of operations performed using one or more implements of the work machine;
   determining that the work machine is performing a particular operation of the plurality of operations based on monitoring the plurality of operations;
   obtaining, based on information regarding the particular operation, camera view information, from a data structure, indicating that the particular operation is associated with a particular camera of a plurality of cameras of the work machine, and wherein each camera, of the plurality of cameras, captures a respective view of a plurality of views of the work machine;
   determining, based on the camera view information, that a bandwidth associated with a video stream, of a particular view, of the plurality of views, of the work machine captured by the particular camera, is to be increased; and
   increasing the bandwidth associated with the video stream provided by the particular camera based on determining that the bandwidth is to be increased.

2. The method of claim 1, further comprising:
   determining, based on the camera view information, that other cameras of the plurality of cameras are not utilized during the particular operation;
   determining that bandwidths associated with video streams, of other views of the work machine captured by the other cameras, are to be decreased based on determining that the other cameras of the plurality of cameras are not utilized during the particular operation; and
   decreasing the bandwidths associated with the video streams based on determining that the bandwidths are to be decreased.

3. The method of claim 1, further comprising:
determining that the particular operation is a ripping operation performed by a first implement of the one or more implements or an earth moving operation performed by a second implement of the one or more implements; and
determining, based on the camera view information, that the particular operation is associated with a first camera based on determining that the particular operation is the ripping operation; or
determining, based on the camera view information, that the particular operation is associated with a second camera and a third camera based on determining that the particular operation is the earth moving operation.

4. The method of claim 1, wherein the data structure stores information identifying the plurality of operations in association with information identifying the plurality of cameras, and
wherein information identifying each operation, of the plurality of operations, is associated with information identifying a respective camera of the plurality of cameras.

5. The method of claim 1, wherein the work machine is operated by a remote control device, and
wherein the method further comprises:
causing image quality of the video stream, provided by the particular camera to the remote control device, to be increased.

6. The method of claim 1, wherein the particular operation is a first operation and the particular camera is a first camera, and
wherein the method further comprises:
monitoring usages of the plurality of cameras during the plurality of operations;
generating camera usage data based on monitoring the usages of the plurality of cameras, wherein the camera usage data indicates that a second camera, of the plurality of cameras, is used during a second operation of the plurality of operations; and
updating the data structure based on the camera usage data.

7. The method of claim 1, further comprising:
at least one of:
detecting a movement of the one or more implements,
receiving operator control data from an operator control that controls the one or more implements, or
detecting one or more positions of the one or more implements; and
wherein determining that the work machine is performing the particular operation further comprises:
determining that the work machine is performing the particular operation based on the at least one of detecting the movement, receiving the operator control data, or
detecting the position of the one or more implements.

8. A system comprising:
a plurality of cameras associated with a machine, wherein each camera, of the plurality of cameras, captures a respective view of a plurality of views of the machine; and
a controller, associated with the machine, configured to:
determine that the machine is performing a particular operation of a plurality of operations, wherein the plurality of operations includes one or more operations performed by one or more implements of the machine;
obtain camera view information indicating that the particular operation is associated with a particular camera of the plurality of cameras, wherein the camera view information is obtained using information regarding the particular operation, and wherein the camera view information includes information identifying the particular camera;
determine, based on the camera view information, that a bandwidth associated with a video stream, of a particular view of the machine captured by the particular camera, is to be increased; and
increase the bandwidth associated with the video stream based on determining that the bandwidth is to be increased.

9. The system of claim 8, wherein the camera view information is obtained from a data structure, and
wherein the controller is further configured to:
determine, using a machine learning model, one or more respective cameras, of the plurality of cameras, associated with each operation of the plurality of operations; and
update the data structure to include information identifying one or more respective cameras, of the plurality of cameras, associated with each operation of the plurality of operations.

10. The system of claim 8, wherein the plurality of operations include:
a ripping operation performed by a first implement of the one or more implements, or
an earth moving operation performed by a second implement of the one or more implements, and
wherein the camera view information identifies a first camera associated with the ripping operation and identifies a second camera and a third camera associated with the earth moving operation.

11. The system of claim 8, wherein the plurality of operations include:
a first movement of an implement in a first direction, a second movement of the implement in a second direction opposite the first direction, and
a digging operation performed by the implement, and
wherein the camera view information identifies a first camera associated with the first movement, identifies a second camera associated with the second movement, and identifies a third camera associated with the digging operation.

12. The system of claim 8, wherein the plurality of operations includes a dumping operation, and wherein the camera view information identifies a camera associated with the dumping operation.

13. The system of claim 8, wherein the machine is operated by a remote control device, and
wherein the controller is further configured to:
cause sizes of images of the video stream, provided to the remote control device, to be increased.

14. The system of claim 8, wherein the bandwidth is increased by a particular amount, and
wherein the controller is further configured to:
determine, based on the camera view information, that bandwidths associated with video streams of views of the machine captured by other cameras of the plurality of cameras are to be decreased; and
decrease the bandwidths associated with the video streams based on determining that the bandwidths are to be decreased, wherein a total amount, of the bandwidths, is decreased by the particular amount.

15. A machine, comprising:
one or more implements;
a plurality of cameras,
wherein each camera, of the plurality of cameras, captures a respective view of a plurality of views of the machine; and
a controller configured to:
determine that the machine is performing a particular operation using a particular implement of the one or more implements;
obtain, using information regarding the particular operation, camera view information indicating that the particular operation is associated with a particular camera of the plurality of cameras;
determine that a quality of a video stream, of the particular view of the machine captured by the particular camera, is to be increased based on the camera view information; and
increase the quality of the video stream based on determining that the quality is to be increased.

16. The machine of claim 15, wherein, to increase the quality of the video stream, the controller is further configured to:
increase a bandwidth associated with the video stream.

17. The machine of claim 16, wherein the controller is further configured to:
determine that bandwidths associated with video streams, of views of the machine captured by other cameras of the plurality of cameras, are to be decreased; and
decrease the bandwidths associated with the video streams based on determining that the bandwidths are to be decreased.

18. The machine of claim 15, wherein, to increase the quality of the video stream, the controller is further configured to:
determine that the particular operation is performed autonomously by the particular implement; and
decrease the quality based on determining that the particular operation is performed autonomously by the particular implement.

19. The machine of claim 15, wherein, to determine that the machine is performing the particular operation using the particular implement, the controller is further configured to:
receive operator control data from an operator control controlling the particular implement.

20. The machine of claim 15, wherein the machine is operated by a remote control device, and wherein the controller is further configured to:
cause image quality of the video stream, provided to the remote control device, to be increased.

\* \* \* \* \*